United States Patent [19]
Zollinger et al.

[11] Patent Number: 5,433,236
[45] Date of Patent: Jul. 18, 1995

[54] APPARATUS FOR MOVING A PIPE INSPECTION PROBE THROUGH PIPING

[75] Inventors: W. Thor Zollinger, Martinez, Ga.; D. Keith Appel, Aiken; Gregory W. Lewis, North Augusta, both of S.C.

[73] Assignee: The United States of America as represented by the United States Department of Energy, Washington, D.C.

[21] Appl. No.: 89,648

[22] Filed: Jul. 12, 1993

[51] Int. Cl.⁶ .............................................. B08B 9/04
[52] U.S. Cl. ...................................... 137/1; 137/268; 15/104.062
[58] Field of Search ................. 137/268; 15/104.062, 15/104.05, 104.061

[56] References Cited

U.S. PATENT DOCUMENTS

| | | | |
|---|---|---|---|
| 3,139,711 | 7/1964 | Soderberg, Jr. | |
| 3,266,076 | 8/1966 | Surber | 15/104.062 |
| 3,322,140 | 5/1967 | Scott | 15/104.062 X |
| 3,384,512 | 5/1968 | Frederick et al. | |
| 3,428,489 | 2/1969 | Gentry, Jr. | 134/8 |
| 3,562,014 | 2/1971 | Childers et al. | 15/104.062 X |
| 3,682,186 | 8/1972 | Howe | 137/1 X |
| 4,135,949 | 1/1979 | Reese | 137/268 X |
| 4,709,719 | 12/1987 | Littleton et al. | 137/268 |
| 4,793,106 | 12/1988 | Valentine et al. | 15/104.062 |
| 4,917,176 | 4/1990 | Shimada et al. | 15/104.062 X |
| 5,095,572 | 3/1992 | Wagner | 15/104.062 X |
| 5,139,576 | 8/1992 | Davis | 15/104.062 X |

Primary Examiner—Martin P. Schwadron
Assistant Examiner—Kevin L. Lee
Attorney, Agent, or Firm—Brian R. Tumm; Harold M. Dixon; William R. Moser

[57] ABSTRACT

A method and apparatus for controllably moving devices for cleaning or inspection through piping systems, including piping systems with numerous piping bends therein, by using hydrostatic pressure of a working fluid introduced into the piping system. The apparatus comprises a reservoir or other source for supplying the working fluid to the piping system, a launch tube for admitting the device into the launcher and a reversible, positive displacement pump for controlling the direction and flow rate of the working fluid. The device introduced into the piping system moves with the flow of the working fluid through the piping system. The launcher attaches to the valved ends of a piping system so that fluids in the piping system can recirculate in a closed loop. The method comprises attaching the launcher to the piping system, supplying the launcher with working fluid, admitting the device into the launcher, pumping the working fluid in the direction and at the rate desired so that the device moves through the piping system for pipe cleaning or inspection, removing the device from the launcher, and collecting the working fluid contained in the launcher.

13 Claims, 4 Drawing Sheets

APPARATUS FOR MOVING A PIPE INSPECTION PROBE THROUGH PIPING

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to methods of and devices for introducing inspection equipment into piping systems. More particularly, the present invention relates to controlling the movement of inspection equipment within piping systems by using relative hydrostatic pressure.

2. Discussion of Background

In fluid piping systems, it is well known to pass various types of cleaning devices, typically referred to as "pigs", through the piping systems along with the flowing fluid. This cleaning process is especially useful in gas pipelines to remove the build-up of liquid deposits caused by water and hydrocarbon vapors condensing in the piping system.

In addition to cleaning pigs, other devices are passed through piping systems for cleaning purposes. Cup pigs, spheres, line scrapers, "bullets" and the like are forced through the pipelines to clean the interior of the piping system. Also, numerous devices for launching the pigs into the piping system are described in the prior art. For example, in U.S. Pat. No. 3,266,076, Surber discloses a pipeline cleaning system having a pig launcher and conduits connected to the pipeline upstream of the launcher that forms a manifold for introducing the pigs into the pipeline. Launching of the pigs is caused by introducing gas into one of the conduits, which causes the launching of the immediately-downstream pig.

The method and manner in which pigs are passed through piping systems depend on the particular launching device that is used. Several U.S. Patents disclose pig launching devices, including U.S. Pat. No. 4,709,719 issued to Littleton et al, U.S. Pat. No. 3,562,014 issued to Childers et al, U.S. Pat. No. 3,322,140 issued to Scott and U.S. Pat. No. 5,139,576 issued to Davis.

Childers et al (U.S. Pat. No. 3,562,014) disclose a launching system for a pig scraper. In this system, the manipulation of valves and the application of fluid pressure launches the pig scrapers from a magazine connected to the production pipeline of interest.

Davis, in U.S. Pat. No. 5,139,576, and Scott, in U.S. Pat. No. 3,322,140, disclose pig launching systems in which pistons are used to launch pigs into horizontal gas transmission pipelines and pressurized pipelines, respectively. Davis discloses positioning a plurality of cup pigs within a horizontal storage magazine and using a piston to drive them into a downstream pipeline. The piston is driven by a liquid such as methanol.

In U.S. Pat. No. 3,322,140, Scott discloses a launcher for continuously injecting solid and semi-solid capsules into pressurized pipelines. The launcher includes a circulating loop having a conduit communicating between the pressurized pipeline and the loop. A launching ram communicates with a low pressure portion of the loop and is operable to introduce capsules into the loop, where they are carried to a high pressure portion of the loop and discharged into the pipeline.

Gravity is used in the pig launching and retrieval system disclosed in U.S. Pat. No. 4,709,719, issued to Littleton et al. In this system, a vertically oriented launching barrel is loaded with a number of cup pigs and placed in communication with the pipeline. The barrel contains a ram for launching cup pigs into the pipeline.

In addition to passing pigs through piping systems for cleaning and the like, launching systems are used to pass inspection or repair devices through piping systems in order to determine, from the piping interior, the location of cracks or other flaws in the piping. Such a launcher is known to be in use by VETCO Piping Services, Inc. of Houston, Tex. Normally, inspection devices or "rabbits" are pushed or pulled through piping systems with thick, sturdy cables. In this manner, negotiating bends in the piping systems is difficult because of the friction of the cable against the piping bends.

Using air pressure to send and receive documents in capsules through piping systems is also well known. There may be a sending pipe and a receiving pipe or there may be one pipe between source and destination and a valve to switch the direction of the air. However, these devices use a pipe dedicated to the movement of the capsule from one end of the piping system to the other and back and do not attempt to control the position or note the location of the capsule in the pipe.

Despite the abundance of cleaning pigs and inspection rabbits available for use in piping systems, there is a need for an improved inspection rabbit that does not rely on burdensome cables to maneuver the rabbit through the piping, especially around bends. Furthermore, the ability to control the direction of the pig or rabbit in the piping system is needed.

SUMMARY OF THE INVENTION

According to its major aspects and broadly stated, the present invention is a method and apparatus for moving cleaning or inspection devices through piping systems. In particular, it is a launcher for controllably moving cleaning devices ("pigs"), inspection devices ("rabbits") and the like through piping systems, especially including piping systems having numerous piping bends, by using a reversible, variable-speed, positive displacement pump and a valving system to create a hydrostatic pressure of the desired magnitude and direction in a working fluid introduced into the piping system. The launching device comprises a reservoir or other source for supplying working fluid to the piping system, a launch tube for admitting the pig or rabbit into the launcher, a reversible pump for changing the flow direction and rate of the working fluid. The device introduced into the piping system moves with the flow of the working fluid through the piping system. The launcher attaches to the valved ends of a piping system so that fluids in the piping system are maintained in a closed environment. The method comprises attaching the launcher to the piping system, filling the launcher and piping system with working fluid, admitting the rabbit or pig into the launcher, pumping the working fluid in the preselected direction and at the preselected rate so that the device moves through the piping system for pipe cleaning or inspection, removing the device from the launcher, and then collecting the working fluid contained in the launcher.

A major feature of the present invention is the precise application of a pressure differential to maneuver the inspection device through the piping, rather than using cables to pull or push the device through the piping. The advantage of this feature is that the inspection rabbit can negotiate as many bends as necessary within the piping system rather than be limited to three or fewer by cable-maneuvered systems. Also, a greater degree of control over movement can be asserted over the inspection rabbit as the direction and magnitude of the applied pressure differential can be adjusted quickly and accurately.

Another feature of the present invention is the use of flexible jumpers for connecting the launcher to a piping system. The flexible jumpers allow the launcher to be connected to a piping system in a manner that maintains a closed loop environment; that is, the portion of the piping system can be isolated and filled with the desired working fluid so that the device can be moved through the piping system and recovered together with the working fluid. This feature is particularly beneficial when using piping systems having hazardous fluids that are not to be released out of the piping system.

Another related feature of the present invention is the use of recovery drains and vents for use with the closed loop environment. This feature, similar to the flexible jumpers previously discussed, helps in the operation of the closed loop and in recovery of the possibly-contaminated working fluid.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

In the following description similar components are referred to by the same reference numeral in order to simplify the understanding of the sequential aspect of the drawings.

Figure 1:
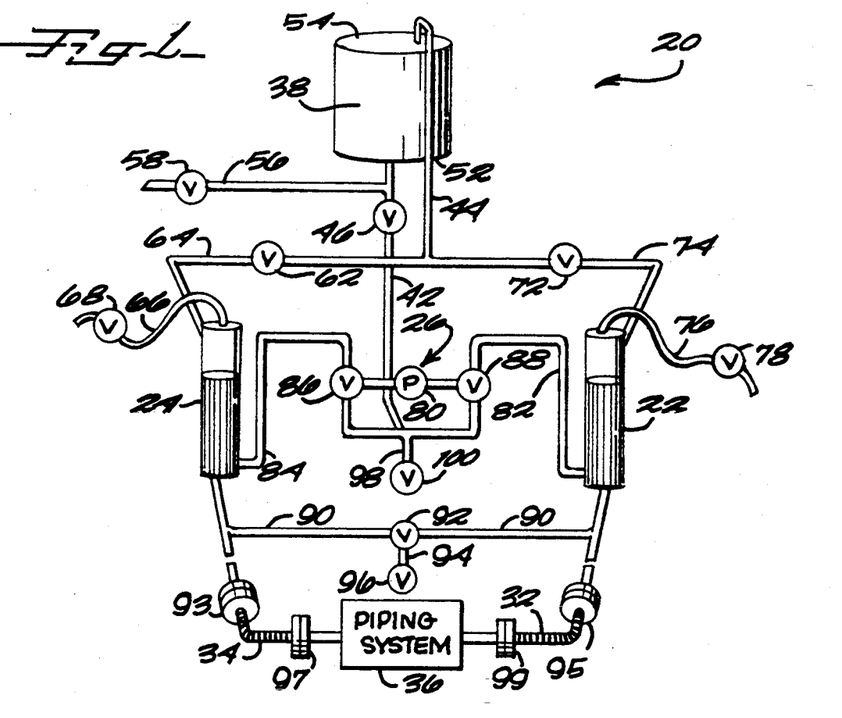
FIG. 1 is a schematic view of an inspection device launcher according to a preferred embodiment of the present invention.

Referring now to FIG. 1, the inspection device launcher 20 in its preferred embodiment is a system comprising a launch tube 22, a receive tube 24 and a fluid control means (shown generally as 26). Also, launcher 20 has a first flexible jumper 32 and a second flexible jumper 34 for establishing fluid communication with a piping system 36 of interest so that "a closed loop environment" of piping system 36 is maintained. A closed loop environment is a flow path formed for a fluid between piping system 36 and launcher 20 in which the fluid can circulate and recirculate, flowing in either direction continuously as long as desired, as opposed to an open loop environment where fluid may flow back and forth but cannot circulate.

A reservoir 38 is a source of working fluid in fluid communication with launcher 20 to supply working fluid to launcher 20 via a launcher supply line 42 and collects vented working fluid from launcher 20 via a launcher vent line 44. Launcher supply line 42 has a 2-way ball valve 46 for controlling the amount of working fluid supplied to launcher 20.

The inspection device (not shown) may be an inspection probe or "rabbit", a cleaning probe or "pig", or some similar probe for use in piping systems such as piping system 36. Preferably, the inspection device includes a miniature, eddy current sensor accompanied by a battery pack and a spool of communication wire for transmitting information. The communication wire is reeled off the spool as the inspection probe is moved through piping system 36. The communication wire establishes an electrical communication link between the probe and its control system.

The inspection device, as discussed in greater detail below, is moved through piping system 36 in a direction and at a rate that enables the particular operation of the device to be performed effectively, be that inspection or cleaning.

Reservoir 38 is preferably displaced above the launcher 20 to provide positive head to the launcher 20. Reservoir 38 has a supply end 52 and a collecting or venting end 54. A supply pipe 56 is connected to supply end 52 of reservoir 38 via a 2-way gate valve 58. Gate valve 58 is positioned between supply pipe 56 and reservoir 38 for controlling the flow rate of the working fluid supplied to reservoir 38.

Receive tube 24 is preferably made of clear PVC pipe and is long enough so that the inspection device fits within the expanded tube section. Preferably, receive tube 24 is larger in diameter than piping system 36 (which can be as small as approximately 2" in diameter) so that the inspection device fits inside loosely for easy insertion and retrieval. A 2-way ball valve 62 is positioned between receive tube 24 and reservoir 38 to allow venting of receive tube 24 to reservoir 38, which occurs through a first main vent line 64 (preferably 1" in diameter) as receive tube 24 is filled or drained. Preferably, receive tube 24 is higher in elevation than vent line 64.

Receive tube 24 is capped or flanged with a first clear, flexible vent line 66 (preferably $\frac{1}{4}$" in diameter) that is valved with a 2-way ball valve 68. When 2-way ball valve 68 is open, first flexible vent line 66 functions as a vent for receive tube 24, thus allowing receive tube 24 to be filled. The complete removal of air from receive tube 24 is critical to precise control of the inspection device. Preferably, line 66 is in fluid communication with a captured drainage tank (not shown).

Similar to receive tube 24, launch tube 22 is preferably made of clear PVC pipe and is long enough to hold the inspection device. Another 2-way ball valve 72 is positioned between launch tube 22 and reservoir 38 to allow venting therebetween, which occurs through a second main vent line 74 (preferably 1" in diameter) connecting launch tube 22 to launcher vent line 44. Preferably, launch tube 22 is higher in elevation than vent line 74. Also, launch tube 22 is preferably larger in diameter than piping system 36 so that the inspection device (sized to the piping) can be inserted and retrieved easily.

Launch tube 22 is capped or flanged with a second clear, flexible vent line 76 (preferably ¼" in diameter) that is valved with a 2-way ball valve 78. Similar to valve 68 in first flexible vent line 66 functioning as a vent for receive tube 24, second flexible vent line 76 functions as a vent for launch tube 22 when 2-way ball valve 78 is in its open position. Preferably, line 76 is in fluid communication with the captured drainage tank (not shown).

Main vent lines 64, 74 are preferably connected below the top of receive tube 24 and launch tube 22, respectively, and run physically lower than the tops of tubes 22, 24 to allow cross draining of the top of tubes 22, 24 through the main vent lines to the opposite tube. Cross draining is necessary to prevent suction from drawing inspection devices back down into the piping while draining launcher 20, as discussed below. Reservoir 38 captures all working fluid that vents from 2-way ball valves 62 and 72 via launcher vent line 44.

Fluid control means 26 is preferably achieved by using a reversible, positive displacement fluid pump 80 in fluid communication with launch tube 22 and receive tube 24 via a pair of supply lines 82, 84, respectively. Preferably, pump 80 should be a gear pump to eliminate pressure pulses. Also, a pair of 3-way valves 86, 88 control the flow of working fluid between pump 80 and receive tube 24 and launch tube 22 via supply lines 82 and 84. Supply lines 82 and 84 are connected to the lower end of launch tube 22 and receive tube 24, respectively, so that the inspection device self-feeds into piping system 36.

Figure 2:
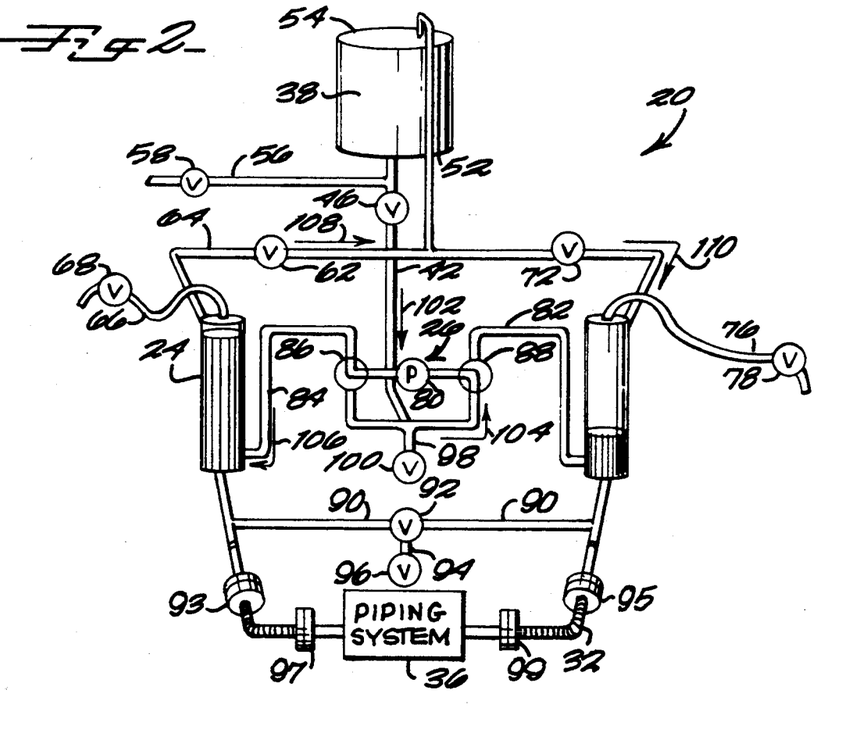
FIG. 2 is a schematic view of the launcher of FIG. 1 showing the flow of working fluid when filling the launcher.
Figure 3:
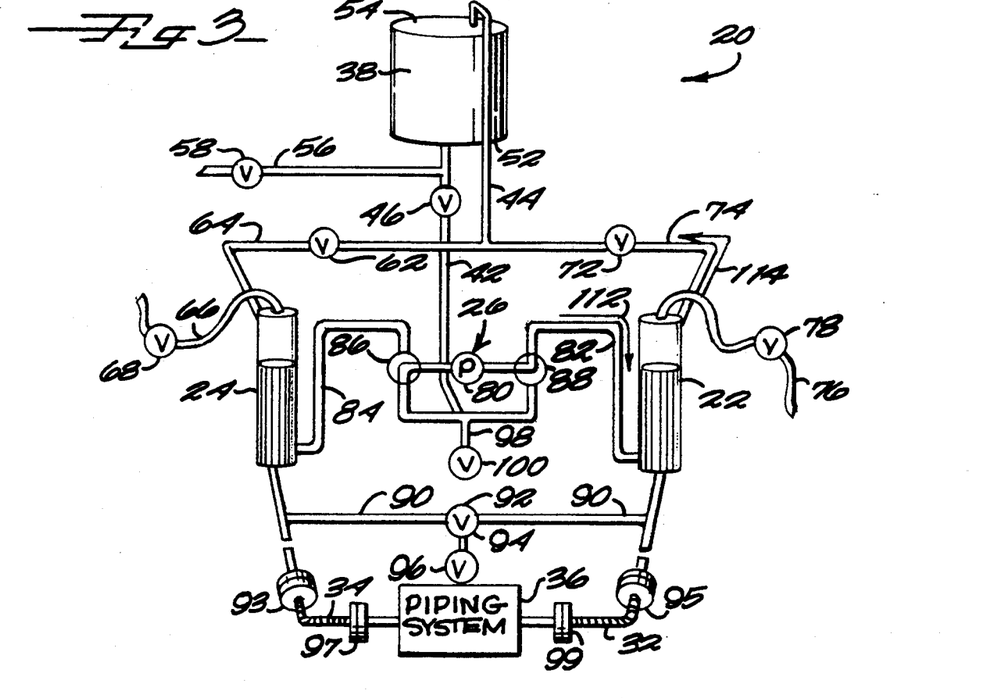
FIG. 3 is a schematic view of the launcher of FIG. 1 showing the flow of working fluid prior to purging residual air.
Figure 4:
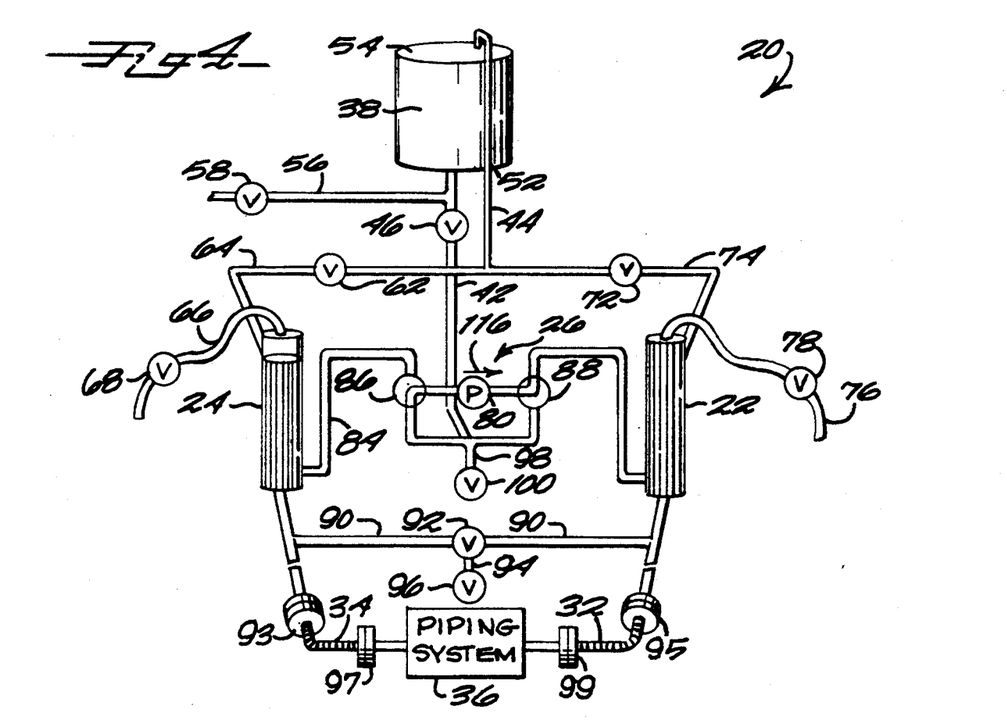
FIG. 4 is a schematic view of the launcher of FIG. 1 showing the flow of working fluid when residual air is being purged.
Figure 6:
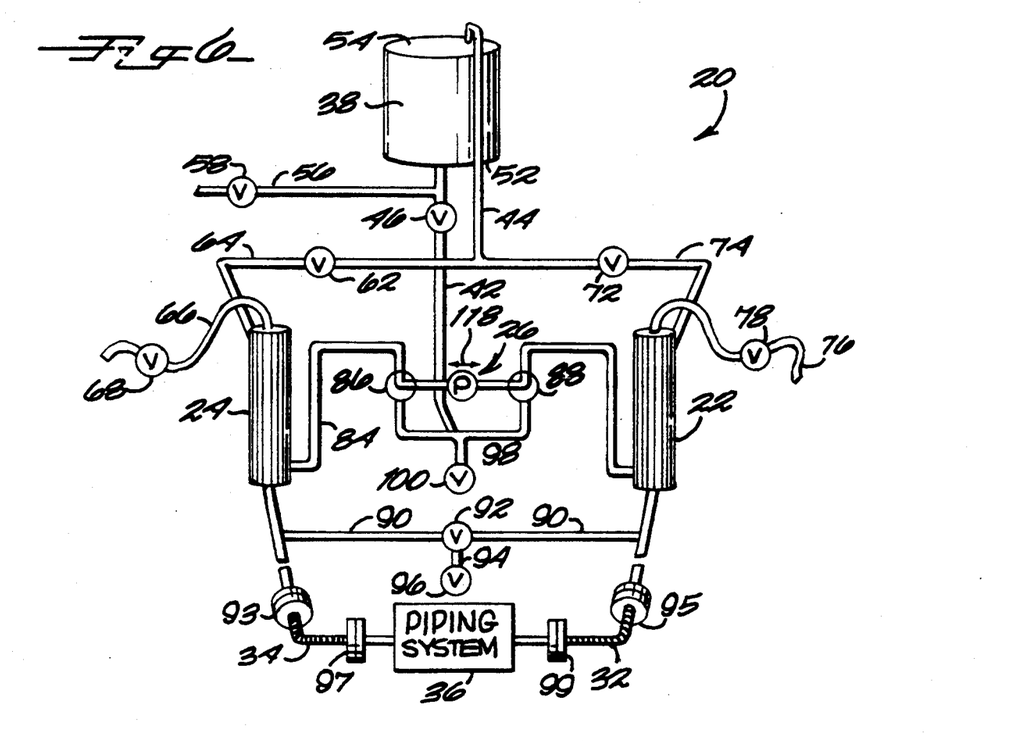
FIG. 6 is a schematic view of the launcher of FIG. 1 showing the flow of working fluid during inspection of the piping system.

Also, 3-way valves 86, 88 control the flow rate and direction of working fluid between launcher supply line 42 and pump 80. That is, when valves 86, 88 are opened to a first position (as shown in FIG. 6), working fluid can pass between pump 80 and both receive tube 24 and launch tube 22, respectively. When valve 86 is opened to a second position (as shown in FIGS. 3 and 4), working fluid can pass from launcher supply line 42 through valve 86 to pump 80. Similarly, when valve 88 is opened to a second position (as shown in FIG. 2), working fluid can pass from launcher supply line 42 through valve 88 to pump 80.

Figure 5:
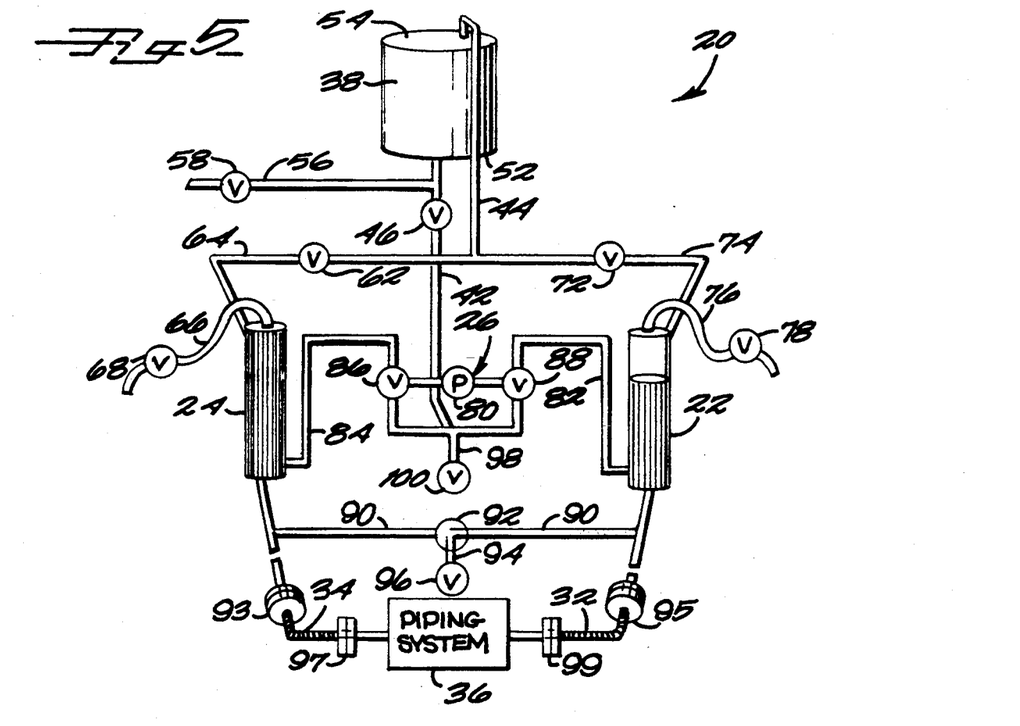
FIG. 5 is a schematic view of the launcher of FIG. 1 showing the working fluid being drained from the launch tube.
Figure 8:
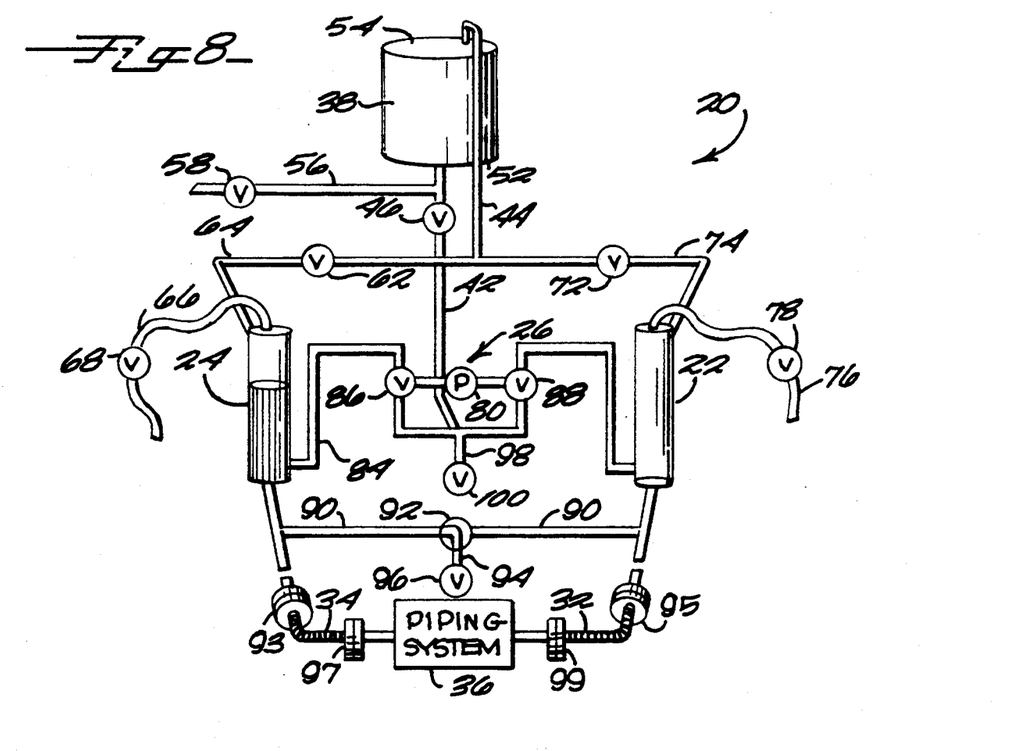
FIG. 8 is a schematic view of the launcher of FIG. 1 showing the working fluid being drained from the launcher.

A lower pipeline 90 (preferably 2" in diameter) establishes fluid communication between receive tube 24 and launch tube 22 via 3-way ball valve 92. A first drain or fluid recovery line 94 has a 2-way ball valve 96 to allow working fluid to be removed from launcher 20. When valve 96 is open and valve 92 is in a first position (as shown in FIG. 5), working fluid can pass from launch tube 22 to first fluid recovery line 94 via lower pipeline 90 and valve 92. Similarly, when valve 96 is open and valve 92 is in a second position (as shown in FIG. 8), working fluid can pass from launch tube 22 to first fluid recovery line 94 via lower pipeline 90 and valve 92.

Also, a second drain or fluid recovery line 98 is in fluid communication with launcher supply line 42 and valves 86, 88. A 2-way ball valve 100 allows working fluid to be removed from launcher 20 via second fluid recovery line 98. Preferably, valves 96, 100 are in fluid communication with the captured drainage tank (not shown) so that a closed loop environment is maintained even when removing working fluid from launcher 20 and piping system 36.

The present launcher 20 is ideally suited for a piping system 36 that is preferably a system of small diameter piping, approximately 2" or smaller and that enters a radioactive or otherwise hazardous waste tank (not shown), and thus is not able to be inspected (or repaired) in any manner other than by a device moved through the interior of the piping.

In use, launcher 20 is connected to piping system 36 by using flexible jumpers 32, 34. Preferably, flexible jumpers 32, 34 connect a pair of flanged fittings 93, 95 of launcher 20 to a pair of flanged connections 97, 99 of piping system 36 so that a fluid communication exists between launcher 20 and piping system 36. In this manner, launcher 20 is connected to piping system 36 so that the closed loop environment of piping system 36 is maintained. That is, fluid can circulate continuously through piping system 36 and launcher 20 whereas, in an open loop environment, fluid can flow only from one end of launcher 20 through piping system 36 to the other end of launcher 20.

Alternatively, launcher 20 can be connected to piping system 36 so that an open loop environment exists, however, the open loop configuration would provide the working fluid only one direction of motion within piping system 36 (or back and forth if there are two sources of a working fluid, one on each end). Also, an open loop lo configuration would present problems with contamination control when piping system 36 has contaminated fluids therein and with retrieval of the inspection or cleaning probe (not shown) from launcher 20.

In FIG. 2, the valve configuration and corresponding flow of working fluid is shown for filling launcher 20. Initially, in order to fill launcher 20, valve 46 is opened and then valves 62 and 72 are opened. Next, valve 86 is set to its first position and valve 88 is set to its second position (both as shown).

In this valve configuration, working fluid will gravity feed into launcher 20 (shown generally as arrow 102) and fill receive tube 24 (shown generally as arrows 104 and 106) from the bottom. Receive tube 24 should be filled completely, which will be indicated when working fluid runs into launch tube 22 from main vent lines 64 and 74 through open valves 62 and 72 (arrows 108 and 110). Launch tube 22 should be filled in this manner until approximately half of launch tube 22 is filled with working fluid. When launch tube 22 has been filled approximately halfway, valves 62, 72 should be closed. Finally, valves 86, 88 should then be closed.

In FIGS. 3-5, the valve configuration and corresponding flow of working fluid is shown for purging residual air from launcher 20 and cleaning piping system 36 when using a cleaning "pig" rather than an inspection "rabbit". If the level of working fluid in launch tube 22 is too high for insertion of a cleaning pig as a result of the steps previously discussed for filling launcher 20, working fluid can be drained from launch tube 22 as shown in FIG. 7.

Figure 7:
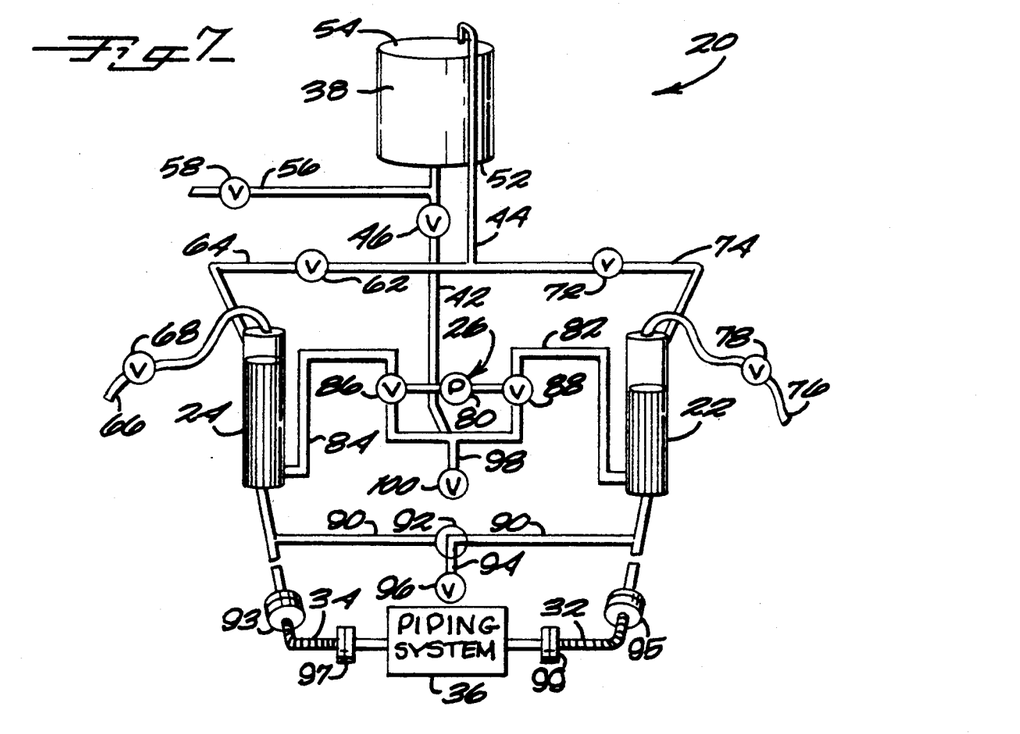
FIG. 7 is a schematic view of the launcher of FIG. 1 showing working fluid being drained from the launcher for removal of the inspection device from the receive tube.

Working fluid is drained from launch tube 22 by closing valve 96, opening valve 72, and setting valve 92 to its second position so that working fluid can pass from launch tube 22 to drain valve 96 (see FIG. 7). At this point, opening valve 96 will allow working fluid to drain from launch tube 22. As discussed previously, working fluid should be drained from launch tube 22 until launch tube 22 is approximately half full.

With working fluid occupying approximately half of launch tube 22, a cleaning pig (not shown) can be inserted into launch tube 22. Then, valve 86 is set to its second position and valve 88 is set to its first position (both shown in FIG. 3 ). After verifying that valves 62, 72, 68, 78 are open, working fluid will gravity feed into the bottom of launch tube 22 (arrow 112), and then will flow through second main vent line 74 (arrow 114) and eventually into receive tube 24.

At this point, the working fluid should be allowed to fill both launch tube 22 and receive tube 24 completely, in which event will be indicated by the flow of working fluid through flexible vent lines 66, 76. Once the working fluid begins flowing through flexible vent lines 66 and 76, valves 72 and 78 are to be closed.

Then, after verifying that valves 62 and 68 are open, activate fluid pump 80 (shown generally in FIG. 4 by arrow 116). Due to the pressure differential created by the activation of fluid pump 80, the cleaning pig will be forced from launch tube 22 through piping system 36 to receive tube 24. Once the cleaning pig appears in receive tube 24, fluid pump 80 should be deactivated.

In order to remove the cleaning pig from receive tube 24, close valves 86 and 88, and set valve 92 to its first position. Then, open valve 96 to allow a sufficient amount of the working fluid to drain from receive tube 24. The cleaning pig will float to the top of the working fluid remaining in receive tube 24. Thus, the cleaning pig can be removed from receive tube 24 without spilling any of the working fluid remaining in receive tube 24.

Finally, launch tube 22 is drained until approximately half of the working fluid in launch tube 22 is removed. This process is performed by repeating the sequence of steps previously mentioned above for draining launch tube 22. That is, closing valve 96, opening valve 72 and setting valve 92 to its second position (as shown in FIG. 7). Then, opening valve 96 to allow the working fluid to begin draining from launch tube 22. Once approximately half of the working fluid in launch tube 22 has been drained, valves 92 and 96 are closed.

Referring again to FIG. 2, the valve configuration and corresponding flow of working fluid is shown for inserting the inspection device or rabbit into launch tube 22 and removing air from launch tube 22 and receive tube 24. It is assumed, at this point, that launch tube 22 is approximately half full of working fluid. Thus, an inspection rabbit can be placed in launch tube 22 without causing any spillage of working fluid. Once the inspection rabbit is placed in launch tube 22, vent valves 62, 72, 68 and 78 are opened.

Next, with valve 86 set to its first position and valve 88 set to its second position (as shown in FIG. 2), valve 46 is opened. As a result of this valve configuration, working fluid will gravity feed into the bottom of receive tube 24 (arrows 102, 104 and 106). It is desirable to allow the working fluid to fill receive tube 24 completely, whereby the excess working fluid will pass into launch tube 22 through main vent lines 64 and 74 (arrows 108 and 110). Valves 62, 72, 68 and 78 should be closed after it is observed that a steady flow of working fluid is passing through them. Finally, valves 86 and 88 are closed.

In FIG. 6, the valve configuration and corresponding flow of working fluid is shown for inspecting piping system 36. As shown, valve 86 is placed in its first position and valve 88 is placed in its first position. Then, upon verification that valves 62 and 72 are closed, fluid pump 80 is activated (shown generally as arrow 118) to move the inspection rabbit from launch tube 22 through piping system 36. It is important to remember that reversing fluid pump 80 results in the rabbit reversing its direction within piping system 36. Thus, the magnitude and direction of fluid pump 80 directly controls the positioning of the rabbit within piping system 36.

In FIG. 7, the valve configuration and corresponding flow of working fluid is shown for draining launcher 20 for the purpose of removing the inspection rabbit. Initially, valves 62 and 72 are opened and valve 92 is set to its second position. Then, valve 96 is opened to allow a sufficient amount of working fluid to drain from receive tube 24 through main vent lines 64 and 74, launch tube 22, lower pipeline 90 and first recovery line 94. Obviously, working fluid drains from launch tube 22 via lower pipeline 90 and first recovery line 94.

Valve 96 is kept open until a sufficient amount of the working fluid drains from receive tube 24 so that the rabbit can be removed without causing spillage. Once the rabbit has been removed, valve 96 is opened to allow the level of working fluid in launch tube 22 to drain until launch tube 22 is approximately half full. Finally, valve 96 is closed.

In FIG. 8, the valve configuration and corresponding flow of working fluid is shown for draining launcher 20. First, it must be verified that valve 46 is closed and that valves 62, 72, 68 and 78 are open. Next, valve 100 is opened and then valve 96 is opened. Valve 92 is then opened to controllably drain each side of launcher 20, that is receive tube 24 and launch tube 22. Upon completion of draining, valves 92, 96 and 100 are closed.

It will be apparent to those skilled in the art that many changes and substitutions can be made to the preferred embodiment herein described without departing from the spirit and scope of the present invention as defined by the appended claims.

What is claimed is:

1. Apparatus for moving a device through a piping system, said piping system having a first end and a second end, said apparatus comprising:

means for connecting said apparatus to said piping system so that said apparatus and said piping system are in fluid communication;

a source of working fluid for use in said apparatus and said piping system;

means in fluid communication with said first end for loading said device into said piping system;

means in fluid communication with said second end for removing said device from said piping system; and means in fluid communication with said source for reversibly applying a pressure differential of varying magnitude to said working fluid so that said working fluid travels controllably through said apparatus and said piping system, said applying means including a reversible pump, and a plurality of valves for directing said working fluid in a first direction from said loading means through said piping system to said removing means and a second direction from said removing means through said piping system to said loading means, said device responding to said pressure differential by moving with said working fluid through said apparatus and said piping system.

2. The apparatus as recited in claim 1, wherein said source has a supply line for supplying working fluid to said apparatus and a collecting line for collecting working fluid vented from said apparatus, said collecting line in fluid communication with said loading means, and wherein said plurality of valves includes a three-way valve located between said pump, said supply line and said loading means, said three-way valve having a first position and a second position, said first position allowing said working fluid to flow between said loading means and said reversible pump, said second position allowing said working fluid to flow between said supply line and said reversible pump.

3. The apparatus as recited in claim 1, wherein said source has a supply line for supplying working fluid to said apparatus and a collecting line for collecting working fluid vented from said apparatus, said collecting line in fluid communication with said source and said removing means, and wherein said plurality of valves includes a three-way valve positioned between said pump, said supply line and said removing means, said three-way valve having a first position and a second position, said first position allowing said working fluid to flow between said removing means and said fluid pump, said second position allowing said working fluid to flow between said supply line and said fluid pump.

4. The apparatus as recited in claim 1, wherein said plurality of valves includes a three-way valve positioned between said loading and removing means for draining said working fluid from said apparatus, said valve having a first position and a second position, said first position allowing said working fluid to drain from said removing means, said second position allowing said working fluid to drain from said loading means.

5. The apparatus as recited in claim 1, wherein said applying means has a first piping end and a second piping end and wherein said connecting means further comprises a first flexible jumper and a second flexible jumper, said first flexible jumper connecting said apparatus to said first piping end and said second flexible jumper connecting said apparatus to said second piping end so that a closed loop is formed between said apparatus and said piping system.

6. A piping system for use with an inspection device, said piping system comprising:

a segment of piping having a first end and a second end;

means in fluid communication with said first end of said piping for loading said inspection device into said piping system;

means in fluid communication with said second end of said piping for removing said inspection device from said piping system;

a source of working fluid in fluid communication with said piping system, said loading means and said removing means; and means in fluid communication with said loading and said removing means for reversibly applying a pressure differential of varying magnitude to said working fluid so that said working fluid travels controllably through said piping system, said applying means including.

a reversible pump, and a plurality of valves positioned between said source, said loading means and said removing means for directing said working fluid in a first direction from said loading means through said piping to said removing means and a second direction from said removing means through said piping to said loading means, said pump varying the magnitude of said pressure differential and reversing the flow of said working fluid between said first and second directions to control direction of said inspection device within said piping system, said inspection device responding to said pressure differential by moving with said working fluid through said loading means, said piping and said removing means.

7. The piping system as recited in claim 6, wherein said source has a supply line for supplying working fluid to said piping system and a collecting line for collecting working fluid vented from said piping system, wherein said loading means is a launch tube, wherein said pump is a positive displacement pump, and wherein said plurality of valves includes a three-way valve positioned between said pump, said supply line and said launch tube;

said three-way valve having a first position and a second position, said first position allowing said working fluid to flow between said launch tube and said pump, said second position allowing said working fluid to flow between said supplying line and said pump.

8. The piping system as recited in claim 6, wherein said source has a supply line for supplying working fluid to said piping system and a collecting line for collecting working fluid vented from said piping system, wherein said removing means is a receive tube, wherein said pump is a positive displacement pump, and wherein said plurality of valves includes;

a three-way valve positioned between said pump, said supply line and said receive tube, said three-way valve having a first position and a second position, said first position allowing said working fluid to flow between said receive tube and said pump, said second position allowing said working fluid to flow between said supplying line and said pump.

9. The piping system as recited in claim 6, wherein said piping system is for use with means for identifying the location of said inspection device within said piping system, and wherein said inspection device further comprises:

an eddy current inspection probe; and a spool of communication wire attached to said inspection probe and to said identifying means.

10. The piping system as recited in claim 6, wherein said plurality of valves includes a three-way valve located between said loading means and said removing means for draining said working fluid from said piping system, said valve having a first position for allowing said working fluid to drain from said removing means and a second position for allowing said working fluid to drain from said loading means.

11. The piping system as recited in claim 6, further comprising a first flexible jumper for connecting said loading means to said first end of said piping so that said loading means and said first end of said piping are in fluid communication and a second flexible jumper for connecting said removing means to said second end of said piping so that said removing means and said second end of said piping are in fluid communication.

12. A method for inspecting a piping system with an inspection probe carrying a pipe-inspecting device, said method for use with a launcher for said probe, said launcher having a source of working fluid, a receive tube in fluid communication with said source, a launch tube in fluid communication with said source, and means in fluid communication with said source, said launch tube and said receive tube for reversibly applying a pressure differential of varying magnitude to said fluid, said method comprising the steps of:

connecting said launcher to said piping system so that fluid communication is established between said source and said piping system;

filling said launcher with said working fluid from said source;

loading said probe into said launch tube;

applying said pressure differential to said fluid whereby said fluid flows through said piping system pushing said probe therewith, said probe inspecting said piping system with said pipe-inspecting device as it moves through said piping system from said launch tube to said receive tube; and removing said probe from said receive tube.

13. The method as recited in claim 12 further comprising the step of adjusting said pressure differential so that said probe moves through said piping system at a preselected speed for inspecting.

* * * * *